(12) United States Patent
Ore-Yang (10) Patent No.: US 11,309,146 B2
(45) Date of Patent: Apr. 19, 2022

(54) MANUFACTURING METHOD FOR FILM STRUCTURE

(71) Applicant: Acrox Technologies Co., Ltd., Taipei (TW)

(72) Inventor: Steve Ore-Yang, Taipei (TW)

(73) Assignee: Acrox Technologies Co., Ltd., Taipei (TW)

( * ) Notice: Subject to any disclaimer, the term of this patent is extended or adjusted under 35 U.S.C. 154(b) by 359 days.

(21) Appl. No.: 16/434,416

(22) Filed: Jun. 7, 2019

(65) Prior Publication Data
US 2020/0203099 A1    Jun. 25, 2020

(30) Foreign Application Priority Data

Dec. 25, 2018 (TW) ................................. 107147039

(51) Int. Cl.
*H01H 13/00* (2006.01)
*B29C 45/00* (2006.01)
(Continued)

(52) U.S. Cl.
CPC ....... *H01H 13/88* (2013.01); *B29C 45/14786* (2013.01); *B32B 1/00* (2013.01); *B32B 3/30* (2013.01); *B32B 5/02* (2013.01); *B32B 27/12* (2013.01); *B32B 27/40* (2013.01); *H01H 13/705* (2013.01); *H01H 13/83* (2013.01);
(Continued)

(58) Field of Classification Search
CPC ...... H01H 13/00; H01H 13/70; H01H 13/705; H01H 13/80; H01H 13/83; H01H 13/88; B29C 45/00; B29C 45/10; B29C 45/14; B29C 45/147; B29C 45/1478; B29C 45/14786; B32B 1/00; B32B 3/00;
(Continued)

(56) References Cited

U.S. PATENT DOCUMENTS

| | | | | |
|---|---|---|---|---|
| 5,677,688 A | * | 10/1997 | O'Mara | H03K 17/969 250/227.22 |
| 6,741,189 B1 | * | 5/2004 | Gibbons, II | H03K 17/969 250/227.22 |
| 10,267,987 B2 | * | 4/2019 | Page | G02B 6/0073 |

FOREIGN PATENT DOCUMENTS

| | | |
|---|---|---|
| CN | 101596803 | 12/2009 |
| TW | 594546 | 6/2004 |
| TW | 201110170 | 3/2011 |

OTHER PUBLICATIONS

U.S. Appl. No. 62/012,273, filed Jun. 14, 2014 Gary Bradski.

* cited by examiner

*Primary Examiner* — Jacob T Minskey
*Assistant Examiner* — Matthew Hoover
(74) *Attorney, Agent, or Firm* — Allen, Dyer, Doppelt + Gilchrist, PA (57) ABSTRACT

The present invention discloses a method to manufacture a keycap for keys of a keyboard, including: providing a top fabric layer and a molding film disposed beneath the top fabric layer; molding the molding film and the top fabric layer to form a film structure having an inner surface; and providing a keycap body having an upper surface, wherein the outline of the upper surface matches with that of the inner surface to form the keycap. In the present invention, the keycap is formed using the film structure and the keycap body by plastic injection or adhesion agent, the keycap is further manufactured as keys, and a symbol is engraved on the upper surface of the film structure by laser. Because the backlit device's light transmits through the keycap, users can recognize the symbols on the keys.

5 Claims, 5 Drawing Sheets

(51) Int. Cl.
*B32B 1/00* (2006.01)
*B32B 3/00* (2006.01)
*B32B 5/00* (2006.01)
*B32B 27/00* (2006.01)
*H01H 13/88* (2006.01)
*B32B 3/30* (2006.01)
*B32B 5/02* (2006.01)
*B32B 27/12* (2006.01)
*B32B 27/40* (2006.01)
*B29C 45/14* (2006.01)
*H01H 13/83* (2006.01)
*H01H 13/705* (2006.01)
*B29L 31/00* (2006.01)
*B29K 75/00* (2006.01)

(52) U.S. Cl.
CPC ....... *B29K 2075/00* (2013.01); *B29L 2031/76* (2013.01); *B32B 2250/03* (2013.01); *B32B 2307/412* (2013.01); *H01H 2229/02* (2013.01); *H01H 2229/044* (2013.01)

(58) Field of Classification Search
CPC .... B32B 3/30; B32B 5/00; B32B 5/02; B32B 27/00; B32B 3/10; B32B 3/12; B32B 3/40
See application file for complete search history.

Fig. 7b (12) United States Patent

MANUFACTURING METHOD FOR FILM STRUCTURE

CROSS-REFERENCE TO RELATED APPLICATION AND CLAIM OF PRIORITY

This application claims the benefit of Taiwan Patent Application No. 107147039, filed on Dec. 25, 2018, at the Taiwan Intellectual Property Office, the disclosures of which are incorporated herein in their entirety by reference.

FIELD OF THE INVENTION

The present invention is related to a manufacturing method for a film structure.

BACKGROUND OF THE INVENTION

Physical keyboards are frequently used in daily life. Users press down keys of a keyboard which indicate specific symbols, so as to input texts, numbers or figures. One type of physical keyboard is the backlit keyboard which is configured on the laptop computer. Light emitting diodes emit white light from the bottom of the backlit keyboard to transmit through laser-engraved symbols on the top of keys, so that users can clearly see the symbols on the keys.

Currently, techniques such as screen printing, computer-controlled spraying, painting, laser engraving and so on are applied to the bottom surface of a rigid film to form symbols thereon. Next, an injection technique is applied to molds to inject plastic materials on the bottom surface of the forming film to form a keycap body, which acts as a half-formed keycap. If the position of the forming film shifts in the mold, the symbol cannot keep in the fixed position when the forming film is molded to have a shape of the keycap. Deformation or distortion can also occur on the symbol. Finally, the symbols on one row of keycaps of the keyboard will be uneven and might cause problems. In addition, heat and pressure generated by the injection technique can also make the reproduced symbols become deformed, and the unqualified yield issue also occurs. In addition, using paint on the keys has environmental ramifications, and the selection for jig may generate tolerance. Therefore, keycaps manufactured by conventional techniques would cause defects easily, and thus requirements such as high yield and extremely low error cannot be satisfied by models currently available on the market.

In another technique, a symbol is engraved on the surface of the rigid film by laser, followed by the plastic injection on the symbol-borne rigid film to form a half-formed keycap. However, the high energy of laser engraving causes the symbol to become yellow and discolored and it will generate rough edges.

It is therefore the Applicant's attempt to deal with the above situation encountered in the prior art.

SUMMARY OF THE INVENTION

To overcome problems with the symbols on the keycaps becoming dislocated, yellowed and deformed when they are being manufactured with current techniques, a novel and progressive manufacturing method for keycaps is provided in the present invention, wherein a top fabric layer (such as a polyurethane (PU) layer or a textile layer) is attached to a molding film to form a film structure for the keycap. The film structure may be formed as a molding film at first, followed by injecting plastic to manufacture the keycap. Alternatively, the film structure is combined with the prepared keycap body by adhesion or engagement, so as to form the keycap for the keyboard device. The keycaps are further manufactured as keys. Symbols are engraved on the keys to enable light to be transmitted through the keycaps. In addition, the film structure may be disposed in the mold to perform the molding and the plastic injection procedures to form the keycaps.

Thus, the present invention discloses a method for manufacturing a keycap of a keyboard device, including: providing a top fabric layer having a top surface; providing one of an in-mold-forming film and an in-mold-decoration film to have a bottom surface; attaching the top fabric layer to the one of the in-mold-forming film and the in-mold-decoration film to form a film structure; molding the film structure in a first mold to form a forming film, wherein the forming film includes an upper surface being the top surface and a lower surface being the bottom surface; injecting a plastic material into a space between the lower surface and a second mold to form a keycap body; and combining the keycap body with the forming film to form the keycap.

In one embodiment, the method further includes: engraving a symbol on the upper surface allowing a light to transmit through the keycap. In one embodiment, the one of the in-mold-forming film and the in-mold-decoration film is made of a material being one selected from the group consisting of polyethylene terephthalate (PET), polycarbonate (PC), polyvinyl chloride (PVC), polypropylene (PP), polyethylene (PE) and acrylonitrile butadiene styrene (ABS). In one embodiment, the keycap includes an outer layer being the top fabric layer. In one embodiment, the plastic material is one of a thermoplastic material and a thermoset plastic material. In one embodiment, the top fabric layer is one of a polyurethane (PU) layer and a textile layer. In one embodiment, the keyboard device includes plural keys configured thereon, and each the key includes the keycap. In one embodiment, the forming film includes a lower surface having a first outline, the keycap body includes an upper surface having a second outline, and the second outline is matched with the first outline. In one embodiment, the one of the in-mold-forming film and the in-mold-decoration film is a molding film.

The present invention further discloses a method for manufacturing a keycap for a keyboard device having plural keys configured thereon, wherein each the key has a film structure, and the keycap is used with each the key, including: providing a top fabric layer; providing a molding film beneath the top fabric layer; causing the molding film and the top fabric layer to form the film structure including a first inner surface having a first outline; providing a keycap body beneath the film structure and including an upper surface having a second outline; and matching the second outline with the first outline to form the keycap.

In one Embodiment, the keycap body includes a second inner surface, each the key includes a key body, the key body includes an outer surface, and the outer surface and the second inner surface have the matched outlines. In one Embodiment, the keycap is fabricated with the key body, the key body further includes a leg or a pivotable leg, the keyboard device has an engagement part, and the leg or the pivotable leg is engaged with the engagement part to be configured on the keyboard device.

The present invention further discloses a method for manufacturing a keycap of a keyboard device, including: providing a top fabric layer having a top surface; providing a molding film having a bottom surface; attaching the top fabric layer with the molding film to form a film structure which has an upper surface being the top surface and a lower surface being the bottom surface; disposing the film structure in a mold having a mold surface to form a space between the film structure and the mold surface; and injecting a plastic material into the space to mold the film structure and to form a keycap body to be combined with the film structure to form the keycap.

In one embodiment, the method further includes: engraving a symbol on the upper surface to allow a light to transmit through the keycap. In one embodiment, the mold includes a core mold, and the space is formed between the lower surface and the core mold. In one embodiment, the mold includes a cavity mold, and the top fabric layer faces the cavity mold.

The phrase "molding film" herein means a film which can be formed on a surface of the top fabric layer (e.g. a PU layer), and the molding film includes, but is not limited to, a film which is formed by spreading a thermoset resin on a surface, a film which can be adhered to the top fabric layer, and an in-mold-forming (IMF) film or an in-mold-decoration (IMD) film.

The phrase "in-mold-forming (IMF) film" herein means a film which is formed in the forming machine followed by trimming and manufacturing in the mold, and generally includes PET, PC, PVC, PP, PE, ABS or a cementing material. The phrase "in-mold-decoration (IMD) film" means a film which has text or figure printed or transferred thereon, and generally includes PET, PC, PVC, PP, PE, ABS or a cementing material.

The phrase "symbol" herein means symbol which indicates a specific meaning on a keyboard device. Users press down the keys to process the computing device, and then the symbol is shown on a screen. "Symbols" include but are not limited to texts, numbers or figures.

BRIEF DESCRIPTION OF THE DRAWINGS

The objectives and advantages of the present invention will become more readily apparent to those ordinarily skilled in the art after reviewing the following detailed descriptions and accompanying drawings.

DETAILED DESCRIPTION OF THE PREFERRED EMBODIMENTS

The present invention will now be described more specifically with reference to the following embodiments. It is to be noted that the following descriptions of the preferred embodiments of this invention are presented herein for purpose of illustration and description only; they are not intended to be exhaustive or to be limited to the precise form disclosed.

Figure 1:
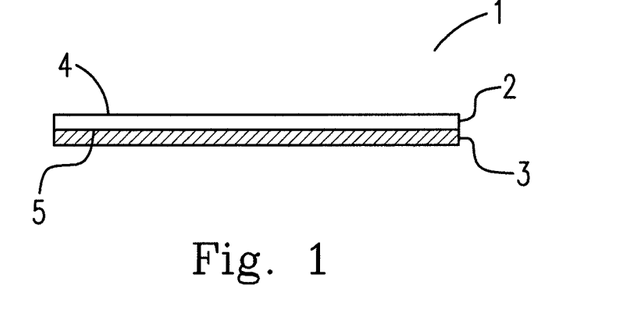
FIG. 1 is a side view showing a film structure of the present invention.

Please refer to FIG. 1, which is a side view showing a film structure of the present invention. In FIG. 1, the film structure 1 of the keycap of a backlit keyboard includes a top fabric layer 2 and a molding film 3, and the top fabric layer 2 can be a polyurethane (PU) layer or a textile layer. After a keycap is formed, the first surface 4 of the top fabric layer 2 is a surface that a symbol can be engraved thereon by laser, and a second surface 5 of the top fabric layer 2 is a surface that is attached to the molding film 3. The top fabric layer 2 can contain thermosol, and the top fabric layer 2 releases thermosol upon heated, so that the second surface 5 and the molding film 3 are attached to form the film structure 1. Alternatively, the top fabric layer 2 does not contain thermosol, but the thermosol is applied on the top fabric layer 2 or the molding film 3. Both the top fabric layer 2 and the molding film 3 are heated to attach with each other. The adoptable molding film 3 includes an in-mold-forming (IMF) film or an in-mold-decoration (IMD) film, and its material includes, but is not limited to polyethylene terephthalate (PET), polycarbonate (PC), polyvinyl chloride (PVC), polypropylene (PP), polyethylene (PE) or acrylonitrile butadiene styrene (ABS).

Figure 2:
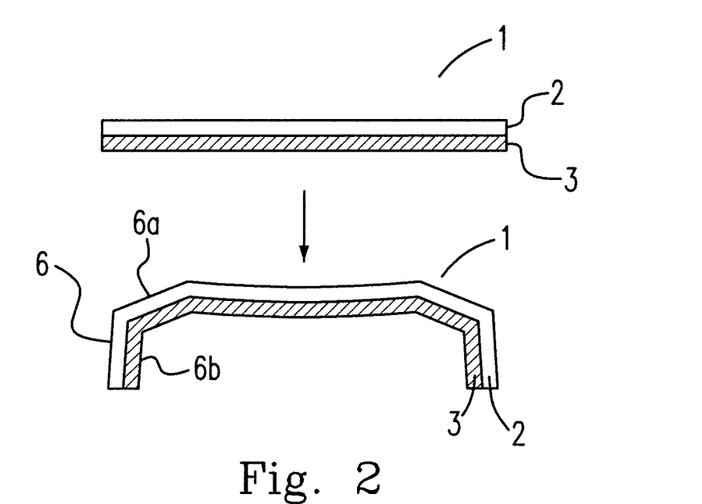
FIG. 2 is a diagram showing that the film structure is molded as a forming film in the present invention.

Please refer to FIG. 2, which is a diagram showing that the film structure is molded as a forming film in the present invention. In FIG. 2, the sheet-like film structure 1 is heated to arrive at a molding temperature, and stretched to a protruded or a concave single-surface mold (not shown). The film structure 1 is molded as a forming film 6 by applying pressure from the film structure 1 to the mold (vacuum suction). One surface of the forming film 6 is an upper surface 6a (i.e. the top fabric layer 2), another surface thereof is a lower surface 6b (i.e. the molding film 3), and this forming film 6 may be an injection molding material in the following plastic injection procedure. The molding film 3 of the forming film 6 presents a shape conforming with the upper surface outline of the keycap, and the top fabric layer 2 which is attached to the molding film 3 also presents the upper surface of the keycap, so that a symbol can be engraved on the upper surface by laser. In FIG. 2, this forming film 6 is illustrated as a single square keycap. However, it is known for the skilled person in the art that the forming film 6 also can be molded as a rectangular keycap (a space bar, for example) or a circle bottom-shaped keycap. Furthermore, a sheet-like film structure can be molded as a forming film having a shape for one or plural keycaps, and the forming film having the shape for plural keycaps is beneficial for manufacturing an abundant amount of keycaps and keys.

Figure 3:
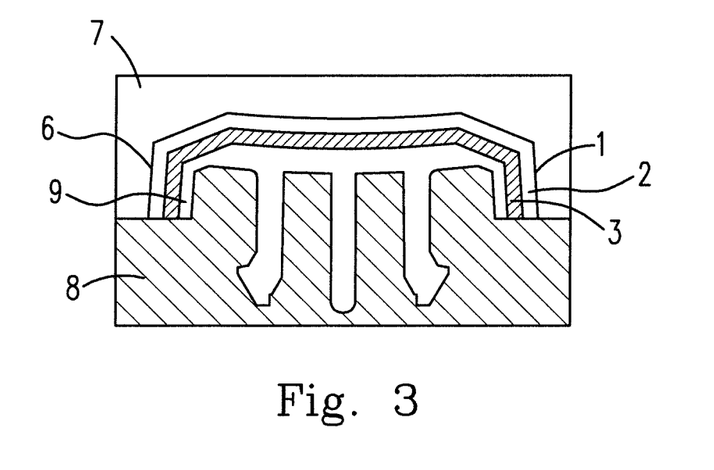
FIG. 3 is a diagram showing that the forming film and the plastic-injected main body are molded as a keycap in a mold in the present invention.

Please refer to FIG. 3, which is a diagram showing that the forming film and the plastic-injected main body are molded as a keycap in a mold in the present invention. In FIG. 3, the forming film 6 is disposed in a closed mold which is composed of a cavity mold 7 and a core mold 8, a melted thermoplastic or thermoset plastic is compressibly injected to the core mold 8 (the space beneath the molding film 3), followed by cooling and solidifying as a main body 9 (or named as a keycap body). The main body 9 and the forming film 6 are molded as a keycap 10 (referring to FIG. 4). Because the main body 9 is molded with the forming film 6 by plastic injection, the outline of the upper surface 9a of the main body 9 and the outline of the lower surface 6b of the forming film 6 are matched with each other to form the keycap 10.

Figure 7A:
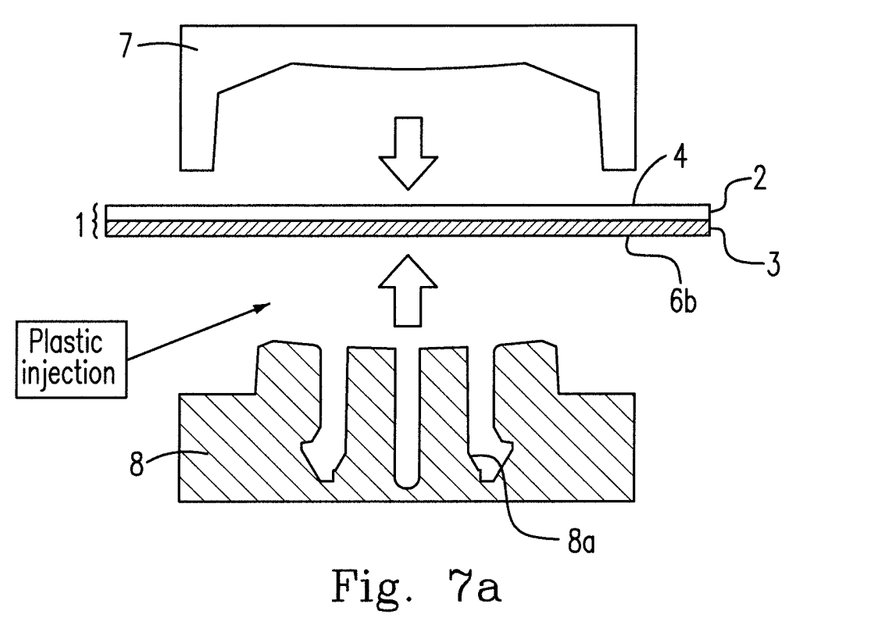
FIG. 7a is a diagram showing that a sheet-like film structure 1 is disposed in the molds and is ready for molding and plastic injection at the same time in the present invention.
Figure 7B:
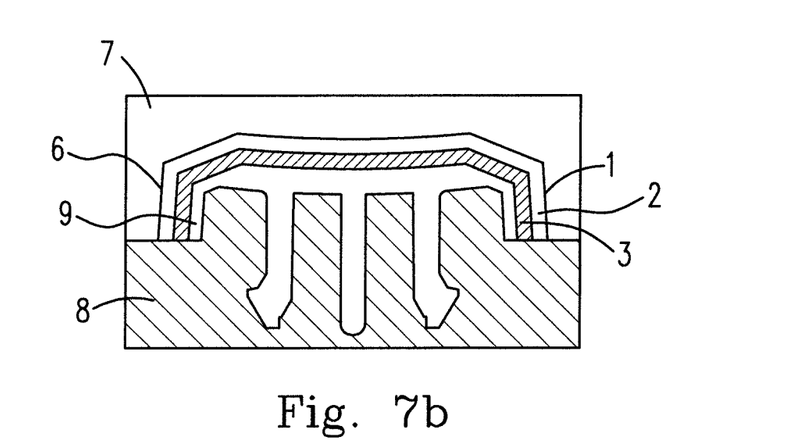
FIG. 7b is a diagram showing that a keycap is formed based on the illustration in FIG. 7 in the present invention.

Alternatively, the sheet-like film structure 1 does not need to be subjected to the molding procedure (i.e. the film structure 1 is molded as the forming film 6; referring to FIG. 2) in advance, but is directly subjected to the molding and plastic injection procedure in the closed mold at the same time to manufacture the keycap 10. That is, the sheet-like film structure 1 is disposed at an un-closed space between the core mold 8 and the cavity mold 7. The core mold 8 has a mold surface 8a (referring to FIG. 7a), and thus a space is formed between the film structure 1 and the mold surface 8a, and the molding film 3 faces the mold surface 8a. When the core mold 8 and the cavity mold 7 are approached and sealed with each other, the film structure 1 is molded depending on the concave-convex structure for the core mold 8 and the cavity mold 7, and at the same time, the melted thermoplastic or thermoset plastic is injected to the core mold 8 (the space beneath the film structure 1) followed by cooling and solidifying to form the main body 9. Finally, the film structure 1 and the main body 9 for the keycap 10 together (referring to FIG. 7b).

Figure 4:
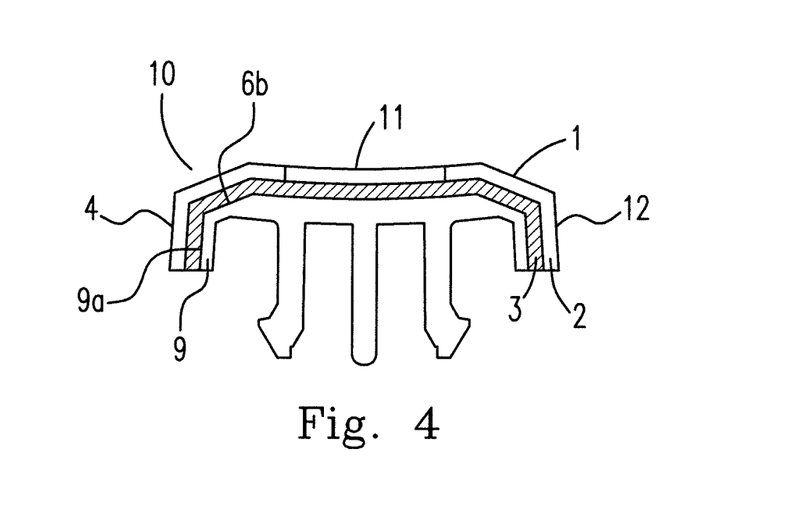
FIG. 4 is a diagram showing a keycap having a laser-engraved symbol thereon in the present invention.
Figure 5:
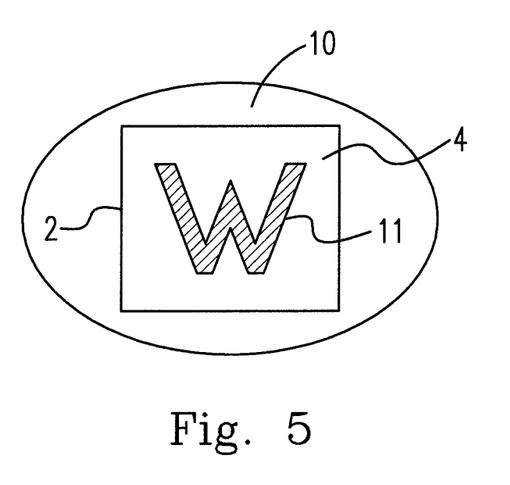
FIG. 5 is a top view showing the keycap having the laser-engraved symbol thereon in the present invention.

Please refer to FIG. 4, the outer surface 12 (i.e. the first surface 4 of the layer 2) of the keycap 10 is released from the cavity mold 7 and the core mold 8), and subjected to a laser engraving procedure to form a symbol 11 thereon. As shown in FIG. 5, light can pass through this symbol 11 to transmit through the keycap 10. When the keycap 10 is further manufactured as a key and is fabricated on the keyboard device (such as a backlit keyboard device), the light irradiated from the light emitting diode (LED) at the bottom of the keyboard device passes through the symbol 11 to transmit through the keycap 10. A User can see the symbols on the keys of the keyboard device appear with the light-transmitted effect. In particular, the effect is more obvious in the dark or at a place with lower background luminance.

In the present invention, the thickness of the PU layer is ranged between 0.1 mm and 0.5 mm, and the thickness of the in-mold-forming film or the in-mold-decoration film is ranged between 0.1 mm and 0.5 mm or between 0.8 mm and 1.0 mm. The skilled person in the art can select the desired thickness of the materials on demand.

The manufactured keycaps are dependent with each other, and can be processed as keys of the keyboard device.

In addition to keycaps manufactured by plastic injection, the molding film can be adhered to the machine element by the adhesion agent to form the light-transmitting element in the present invention, and this light-transmitting element can be further processed as keys of the keyboard device.

Figure 6:
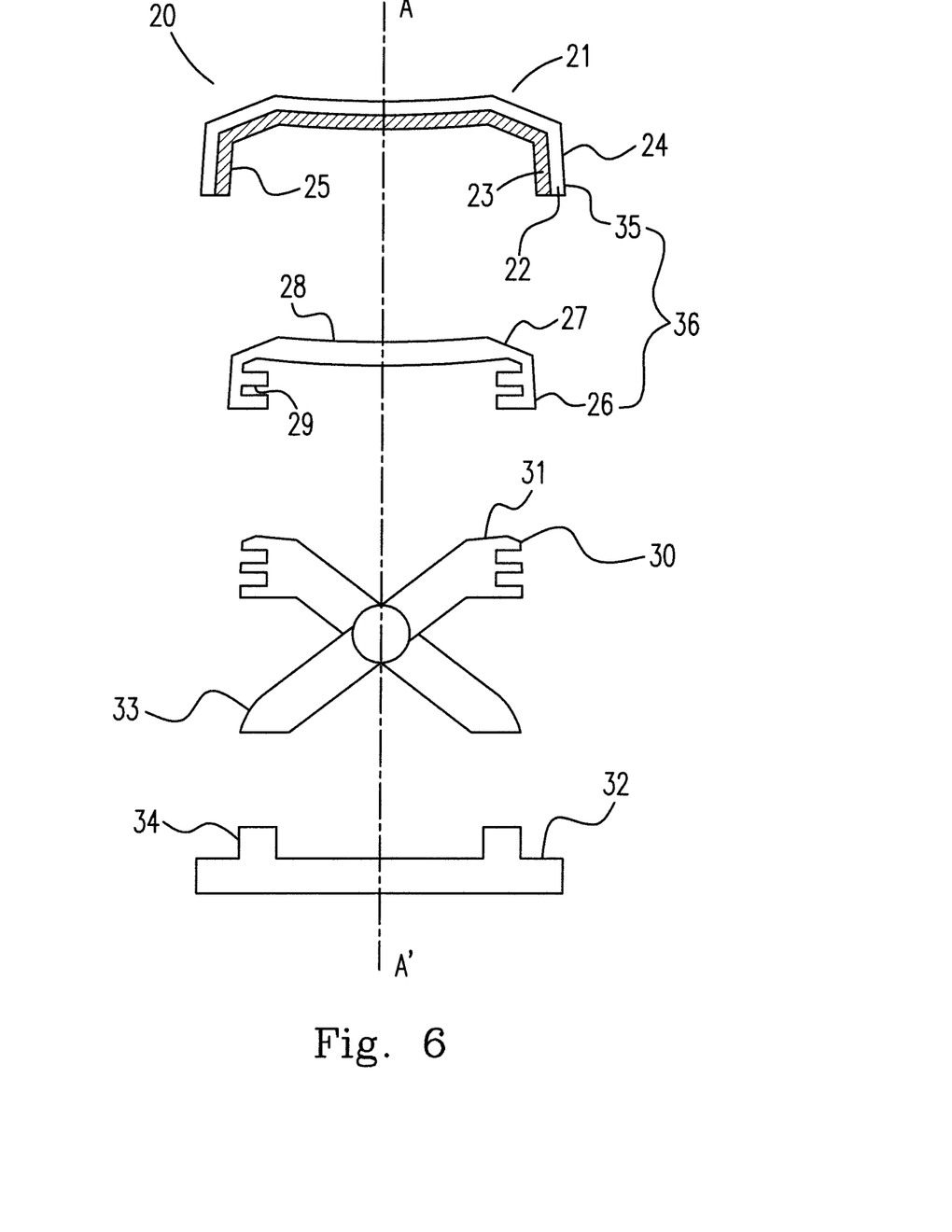
FIG. 6 is a diagram showing a key of a keyboard device in the present invention.

Please refer to FIG. 6, which is a diagram showing a key of a keyboard device in the present invention. In FIG. 6, the key 20 of a keyboard device 32 includes a film structure 21, a keycap body 26 and a key body 30, wherein the key body 30 includes an outer surface 31 and a leg (or a pivotable) 33, and the leg 33 is engaged with the engagement part 34 of the keyboard device 32 to be fabricated on the keyboard device 32. One specific conformation for the key body 30 is a scissors-like structure. When the fabricated key 20 is forced to press down, the scissors-like key body 30 shows a deformation of up-down compression. Once the stress on the key 20 disappears, the deformation also disappears to enable the key body 30 to return to the original shape. The keycap body 26 is a machine element which is manufactured by molding, and includes an upper surface 27, an upper surface outline 28 and an inner surface 29, and the inner surface 29 matches with the outer surface 31. The term "match" means that the outer surface 31 and the inner surface 29 are engaged, adhered or pivoted with each other, thereby that the key body 30 and the keycap body 26 have physical contact or adherence with each other, and are subjected to external force to move the positions or reproduce the physical deformation. In addition, the film structure 21 including the outer surface 24 and the inner surface 25 is molded as a forming film 35 in the mold before being configured on the keycap body 26. The inner surface 25 matches with the upper surface 27 to enable the plastic-injected keycap body 26 and the forming film 35 to form keycap 36, and two surfaces 25 and 26 preferably are adhered by the adhesion agent. Furthermore, the symbol presenting the key 20 is engraved on the outer surface 24, and the keycap 36 can be a backlit component as a whole. Therefore, the film structure 21, the keycap body 26 and the key body 30 are sequentially fabricated as a key 20 on the keyboard device 32 according to the A-A' dash line.

Furthermore, the film structure 21 of the key 20 further includes a molding film 23 and a PU layer 22, wherein the PU layer 22 is disposed on the molding film 23, the molding film 23 is configured on and combined with the upper surface 27 to present the shape of the upper surface outline 28 of the keycap body 26.

Embodiments

1. A method for manufacturing keycaps of a keyboard device, including: providing a top fabric layer having a top surface; providing one of an in-mold-forming film and an in-mold-decoration film to have a bottom surface; attaching the top fabric layer to the one of the in-mold-forming film and the in-mold-decoration film to form a film structure; molding the film structure in a first mold to form a forming film, wherein the forming film includes an upper surface being the top surface and a lower surface being the bottom surface; injecting a plastic material into a space between the lower surface and a second mold to form a keycap body; and combining the keycap body with the forming film to form one of the keycaps.

2. The method according to Embodiment 1, further including engraving a symbol on the upper surface allowing a light to transmit through the keycaps.

3. The method according to Embodiment 1 or 2, wherein the one of the in-mold-forming film and the in-mold-decoration film is made of a material being one selected from the group consisting of polyethylene terephthalate (PET), polycarbonate (PC), polyvinyl chloride (PVC), polypropylene (PP), polyethylene (PE) and acrylonitrile butadiene styrene (ABS).

4. The method according to any one of Embodiments 1-3, wherein the keycaps include an outer layer being the top fabric layer.

5. The method according to any one of Embodiments 1-4, wherein the plastic material is one of a thermoplastic material and a thermoset plastic material.

6. The method according to any one of Embodiments 1-5, wherein the top fabric layer is one of a polyurethane (PU) layer and a textile layer.

7. The method according to any one of Embodiments 1-6, wherein the keyboard device includes plural keys configured thereon, and each the key includes one of the keycaps.

8. The method according to any one of Embodiments 1-7, wherein the forming film includes a lower surface having a first outline, the keycap body includes an upper surface having a second outline, and the second outline is matched with the first outline.

9. The method according to any one of Embodiments 1-8, wherein the one of the in-mold-forming film and the in-mold-decoration film is a molding film.

10. A method for manufacturing keycaps for a keyboard device having plural keys configured thereon, wherein each the key has a film structure, and each of the keycaps is used with each the key, including: providing a top fabric layer; providing a molding film beneath the top fabric layer; causing the molding film and the top fabric layer to form the film structure including a first inner surface having a first outline; providing a keycap body beneath the film structure and including an upper surface having a second outline; and matching the second outline with the first outline to form the keycaps.

11. The method according to Embodiment 10, wherein the keycap body includes a second inner surface, each the key includes a key body, the key body includes an outer surface, and the outer surface and the second inner surface have the matched outlines.

12. The method according to Embodiment 10 or 11, wherein the key body further includes a leg, the keyboard device has an engagement part, and the leg is engaged with the engagement part to be configured on the keyboard device.

13. A method for manufacturing keycaps of a keyboard device, including: providing a top fabric layer having a top surface; providing a molding film having a bottom surface; attaching the top fabric layer with the molding film to form a film structure which has an upper surface being the top surface and a lower surface being the bottom surface; disposing the film structure in a mold having a mold surface to form a space between the film structure and the mold surface; and injecting a plastic material into the space to mold the film structure and to form a keycap body to be combined with the film structure to form the keycaps.

14. The method according to Embodiment 13, further including engraving a symbol on the upper surface to allow a light to transmit through the keycaps.

15. The method according to Embodiment 13 or 14, wherein the mold includes a core mold, and the space is formed between the lower surface and the core mold.

16. The method according to any one of Embodiments 13-15, wherein the mold includes a cavity mold, and the top fabric layer faces the cavity mold.

17. The method according to any one of Embodiments 13-16, wherein each of the keycaps is fabricated with a key body having a pivotable leg, the keyboard device has an engagement part, and the pivotable leg is engaged with the engagement part to be configured on the keyboard device.

While the invention has been described in terms of what is presently considered to be the most practical and preferred Embodiments, it is to be understood that the invention need not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for manufacturing a keycap of a keyboard device, comprising:
   providing a top fabric layer having a top surface;
   providing a molding film having a bottom surface;
   attaching the top fabric layer with the molding film to form a film structure which has an upper surface being the top surface and a lower surface being the bottom surface;
   disposing the film structure in a mold having a mold surface to form a space between the film structure and the mold surface; and
   injecting a plastic material into the space to mold the film structure and to form a keycap body to be combined with the film structure to form the keycap.

2. The method according to claim 1, further comprising engraving a symbol on the upper surface to allow a light to transmit through the keycap.

3. The method according to claim 1, wherein the mold includes a core mold, and the space is formed between the lower surface and the core mold.

4. The method according to claim 1, wherein the mold includes a cavity mold, and the top fabric layer faces the cavity mold.

5. The method according to claim 1, wherein the keycap is fabricated with a key body having a pivotable leg, the keyboard device has an engagement part, and the pivotable leg is engaged with the engagement part to be configured on the keyboard device.

* * * * *